(12) United States Patent
Cho et al.

(10) Patent No.: US 11,820,179 B2
(45) Date of Patent: Nov. 21, 2023

(54) SYSTEM FOR MONITORING TIRE PRESSURE AND METHOD FOR SENSING MALFUNCTION THEREOF

(71) Applicants: Hyundai Motor Company, Seoul (KR); Kia Corporation, Seoul (KR)

(72) Inventors: Jae Sung Cho, Suwon-si (KR); Yong Gu Kang, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 251 days.

(21) Appl. No.: 17/350,428

(22) Filed: Jun. 17, 2021

(65) Prior Publication Data

US 2022/0144025 A1 May 12, 2022

(30) Foreign Application Priority Data

Nov. 10, 2020 (KR) ........................ 10-2020-0149544

(51) Int. Cl.
*B60C 23/04* (2006.01)
*B60C 23/06* (2006.01)

(52) U.S. Cl.
CPC ...... *B60C 23/0488* (2013.01); *B60C 23/0474* (2013.01); *B60C 23/061* (2013.01); *B60C 23/065* (2013.01)

(58) Field of Classification Search
CPC ............ B60C 23/0488; B60C 23/0474; B60C 23/061; B60C 23/065; B60C 23/062; B60C 23/0471; B60C 23/02; B60C 23/0403; B60C 23/0405; B60C 2019/006; B60C 2200/04; B60Y 2400/3032

USPC .................................................. 340/440, 442
See application file for complete search history.

(56) References Cited

U.S. PATENT DOCUMENTS

| | | | | |
|---|---|---|---|---|
| 5,541,573 A * | 7/1996 | Jones | ..................... | B60C 23/061 340/444 |
| 6,459,369 B1 * | 10/2002 | Wang | ..................... | B60C 23/061 73/146 |
| 7,661,299 B2 * | 2/2010 | Kusunoki | ........... | B60C 23/0408 73/146 |
| 8,970,361 B2 * | 3/2015 | Sakagami | ............. | B60C 23/061 73/146 |
| 2008/0178667 A1 * | 7/2008 | Kusunoki | ............. | B60C 23/044 73/146.4 |
| 2013/0321138 A1 * | 12/2013 | Sakagami | ............. | B60C 23/061 340/442 |

FOREIGN PATENT DOCUMENTS

DE        102012206845 A1    10/2013

* cited by examiner

*Primary Examiner* — Eric Blount
(74) *Attorney, Agent, or Firm* — Slater Matsil, LLP

(57) ABSTRACT

An embodiment system for monitoring a tire pressure includes a wheel speed sensor mounted on each wheel of a vehicle, a set button for resetting a pressure setting, and a controller configured to determine whether the tire pressure is low using the wheel speed sensor, output a low pressure warning, determine whether a user has an intention to reset the pressure setting when a manipulation of the set button is sensed after the low pressure warning is output, and reset the pressure setting in response to a response of the user.

20 Claims, 11 Drawing Sheets

SYSTEM FOR MONITORING TIRE PRESSURE AND METHOD FOR SENSING MALFUNCTION THEREOF

CROSS-REFERENCE TO RELATED APPLICATIONS

This application claims the benefit of Korean Patent Application No. 10-2020-0149544, filed in the Korean Intellectual Property Office on Nov. 10, 2020, which application is hereby incorporated herein by reference.

TECHNICAL FIELD

The present disclosure relates to a system for monitoring a tire pressure and a method for sensing a malfunction thereof.

BACKGROUND

A tire pressure monitoring system (TPMS) is a safety system that senses a pressure of a tire and warns a driver when the pressure is insufficient, thereby preventing an accident resulting from tire damage in advance. Tire pressure measurement schemes of such a TPMS are divided into a direct scheme of directly measuring an internal pressure of the tire through a sensor and an indirect scheme of measuring the internal pressure of the tire using a wheel speed measured through a wheel speed sensor. Among those, when the driver manipulates a reset button without adjusting the pressure of the tire regardless of an intention, an indirect-type TPMS determines a pressure at a time point at which the driver manipulated the reset button as a normal pressure, so that a low pressure state may not be alerted or an alert time point may be delayed despite an actual tire pressure being a low pressure.

SUMMARY

Embodiments of the present disclosure can solve problems occurring in the prior art while advantages achieved by the prior art are maintained intact.

An embodiment of the present disclosure provides a system for monitoring a tire pressure and a method for sensing malfunction thereof that prevent system reset resulting from a wrong manipulation of a user in a state in which the tire pressure is low.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, a system for monitoring a tire pressure includes a wheel speed sensor mounted on each wheel of a vehicle, a set button for resetting pressure setting, and a controller that determines whether the tire pressure is low using the wheel speed sensor and outputs a low pressure warning, and the controller determines whether a user has an intention to reset the pressure setting when a manipulation of the set button is sensed after the low pressure warning, and performs the pressure setting reset in response to a response of the user.

According to another embodiment of the present disclosure, a system for monitoring a tire pressure includes a wheel speed sensor mounted on each wheel of a vehicle, a set button for resetting pressure setting, and a controller connected to the wheel speed sensor and the set button, and the controller inspects whether the tire pressure is low using the wheel speed sensor, outputs a low pressure warning, and stores tire pressure determination information, activates a pressure setting reset prohibition mode when vehicle stop and a manipulation of the set button are sensed, and outputs the low pressure warning when a wrong manipulation of the set button is sensed in the pressure setting reset prohibition mode.

In one implementation, the tire pressure determination information may include at least one of a change amount of a dynamic radius and/or a change amount of a frequency of a tire.

In one implementation, the controller may count the number of low pressure occurrences when at least one of the change amount of the dynamic radius and/or the change amount of the frequency exceeds a threshold value, and may output the low pressure warning when the number of low pressure occurrences exceeds a reference number of times.

In one implementation, the controller may monitor a state of the tire pressure using the previously stored tire pressure determination information as an initial value when the vehicle travels again after stopping.

In one implementation, the controller may determine a re-manipulation of the set button as a wrong manipulation of the set button when the set button is manipulated again in the pressure setting reset prohibition mode within a predetermined time from a low pressure warning output time point.

In one implementation, the controller may determine a re-manipulation of the set button as a normal manipulation when the set button is manipulated again in the pressure setting reset prohibition mode after a predetermined time elapses from a low pressure warning output time point.

In one implementation, the controller may count the number of wrong manipulations whenever the wrong manipulation of the set button is sensed, and perform a pressure setting reset while releasing the low pressure warning when the number of wrong manipulations exceeds the threshold number of times.

In one implementation, the controller may release the low pressure warning but maintain the pressure setting reset prohibition mode when the manipulation of the set button is a normal manipulation in the pressure setting reset prohibition mode.

In one implementation, the controller may release the low pressure warning and cancel the pressure setting reset prohibition when it is identified that the tire pressure is in a normal state in the pressure setting reset prohibition mode.

In one implementation, the controller may output the low pressure warning again and maintain the pressure setting reset prohibition when it is identified that the tire pressure is in an abnormal state in the pressure setting reset prohibition mode.

According to another embodiment of the present disclosure, a method for sensing malfunction of a system for monitoring a tire pressure includes inspecting (measuring) a state of the tire pressure using a wheel speed sensor, outputting a low pressure warning when it is determined that the tire pressure is low, determining whether a driver has an intention to reset a pressure setting when a manipulation of a set button is sensed during the low pressure warning, and performing a pressure setting reset when the driver has the intention to reset the pressure setting.

In one implementation, the determining of whether the driver has the intention to reset the pressure setting may include allowing the driver to select by default that the driver has no intention to reset the pressure setting.

According to another embodiment of the present disclosure, a method for sensing malfunction of a system for monitoring a tire pressure includes a first operation of sensing that the tire pressure is low using a wheel speed sensor, outputting a low pressure warning, and storing tire pressure determination information, a second operation of activating a pressure setting reset prohibition mode and determining whether a manipulation of a set button is a wrong manipulation when vehicle stop and the manipulation of the set button are sensed after the low pressure warning, and a third operation of outputting the low pressure warning when the manipulation of the set button is determined as a wrong manipulation.

In one implementation, the first operation may include determining whether at least one of a change amount of a dynamic radius and/or a change amount of a frequency of a tire exceeds a threshold value, counting the number of low pressure sensing occurrences when the at least one change amount exceeds the threshold value, outputting the low pressure warning when the number of low pressure sensing occurrences exceeds a reference number of times, and storing the at least one change amount.

In one implementation, the second operation may include determining a re-manipulation of the set button as a wrong manipulation of the set button when the set button is manipulated again within a predetermined time from a low pressure warning output time point, and determining a re-manipulation of the set button as a normal manipulation when the set button is manipulated again after a predetermined time elapses from the low pressure warning output time point.

In one implementation, the third operation may include counting the number of wrong manipulations whenever the wrong manipulation of the set button is determined, and performing the pressure setting reset while releasing the low pressure warning when the number of wrong manipulations exceeds the threshold number of times.

In one implementation, the third operation may include releasing the low pressure warning, learning the tire pressure using the wheel speed sensor, and storing the learned value when the normal manipulation of the set button is sensed.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
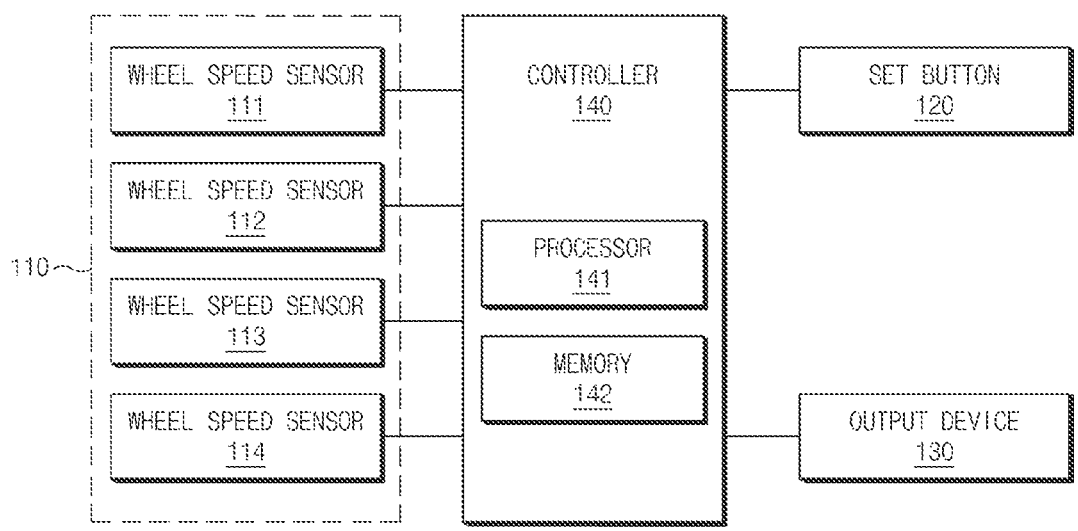
FIG. 1 illustrates a block diagram of a tire pressure monitoring system according to embodiments of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a block diagram of a tire pressure monitoring system according to embodiments of the present disclosure.

Referring to FIG. 1, a tire pressure monitoring system 100 may include a wheel speed sensor 110, a set button 120, an output device 130, and a controller 140.

The wheel speed sensor 110 may be mounted on a wheel to measure a wheel speed during vehicle travel. For example, wheel speed sensors 111, 112, 113, and 114 may be mounted on a left front wheel, a right front wheel, a left rear wheel, and a right rear wheel, respectively. A measurement signal output from the wheel speed sensor 110 may be used to measure a dynamic radius and a change in a frequency of a tire.

The set button 120 may generate data resulted from a manipulation of a user. For example, when a pressed state is maintained for 3 seconds or longer, the set button 120 may generate a setting signal (a setting command). The set button 120 may be implemented as a push button, a touch button, a toggle switch, or the like. The set button 120 may be disposed on a steering wheel, a dashboard, a center fascia, and/or a door trim.

The output device 130 may output a warning indicating a state in which a pressure of the tire is low in a form of visual information and/or auditory information. The output device 130 may include a warning light, a cluster, a display, and/or a speaker.

The controller 140 may process and analyze a sensor signal output from the wheel speed sensor 110 to determine whether the pressure of the tire is low. The controller 140 may include a processor 141 and a memory 142. The processor 141 may control overall operations of the controller 140. The processor 141 may be implemented as at least one of an application specific integrated circuit (ASIC), a digital signal processor (DSP), a programmable logic device (PLD), a field programmable gate array (FPGA), a central processing unit (CPU), a microcontroller, and/or a microprocessor. The memory 142 may be a non-transitory storage medium that stores instructions executed by the processor 141. The memory 142 may include a flash memory, a hard disk, a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), a register, an embedded multimedia card (eMMC), and/or universal flash storage (UFS).

When the setting command is input from the set button 120 after vehicle and tire maintenance, the processor 141 may set the tire pressure (that is, a normal pressure) as a reference pressure (that is, a decompression determination criterion). In other words, when the set button 120 is manipulated, the processor 141 may learn the normal pressure of the tire to set the decompression determination criterion. The processor 141 may store the reference pressure in the memory 142.

The processor 141 may sense (determine) whether the tire pressure is low (decompressed) by analyzing the dynamic radius and/or the frequency of the tire using the sensor signal of the wheel speed sensor 110 during the travel. When it is sensed that the tire pressure is low, the processor 141 may output the low pressure warning on the output device 130. The output device 130 may turn on the warning light indicating that the tire pressure is low or output a warning message on a display screen. In this connection, the output device 130 may output a warning sound along with the turn on of the warning light or the output of the warning message. When outputting the low pressure warning, the processor 141 may store tire pressure determination information at a corresponding time point. In this connection, the tire pressure determination information is information used to determine a tire pressure state, which may include a change amount of the dynamic radius and/or a change amount of the frequency of the tire.

When sensing the manipulation of the set button 120 during the low pressure warning, the processor 141 may output a selection screen for selecting whether to reset pressure setting to determine whether the manipulation is intended by the user (e.g., a driver) on the display. When the user selects the pressure setting reset, the processor 141 may release the low pressure warning and may perform the pressure setting reset. Further, the processor 141 may maintain the low pressure warning when the user does not select the pressure setting reset.

The processor 141 may sense that the tire pressure is low based on the tire pressure determination information obtained using the wheel speed sensor 110. For example, the processor 141 may determine that the tire pressure is low when the change amount of the dynamic radius of the tire exceeds a reference change amount. In addition, the processor 141 may determine that the tire pressure is low when the change amount of the frequency of the tire exceeds a reference change amount. The processor 141 may count the number of low pressure sensing (the number of low pressure occurrences) whenever sensing that the tire pressure is low. When the number of low pressure sensing exceeds a reference number of times, the processor 141 may store the tire pressure determination information (the change amount of the dynamic radius and/or the change amount of the frequency) in the memory 142 while outputting the low pressure warning. The processor 141 may keep monitoring the change amount of the dynamic radius and/or the change amount of the frequency after replacing the tire pressure determination information previously stored in the memory 142, that is, the change amount of the dynamic radius and/or the change amount of the frequency with a default value after the low pressure warning.

When the vehicle stops after the low pressure warning and the set button 120 is manipulated, the processor 141 may determine whether the manipulation of the set button 120 is a wrong manipulation. When the set button 120 is manipulated (pressed) within a predetermined time from a time point of outputting the low pressure warning (a low pressure warning time point), the processor 141 may determine that the manipulation is the wrong manipulation. The processor 141 may determine that the manipulation is not the wrong manipulation when the set button 120 is manipulated after a predetermined time elapses from the low pressure warning time point.

The processor 141 may count the number of wrong manipulations when the manipulation of the set button 120 is determined to be the wrong manipulation. When the number of wrong manipulations exceeds the threshold number of times, the processor 141 may release the low pressure warning and perform the pressure setting reset. The processor 141 may maintain the low pressure warning when the number of wrong manipulations does not exceed the threshold number of times.

When the manipulation of the set button 120 is a normal manipulation, the processor 141 may release the low pressure warning and learn the change amount of the dynamic radius and/or the change amount of the frequency of the tire. The processor 141 may store the learned change amount of the dynamic radius and/or change amount of the frequency in the memory 142 as the decompression determination criterion. When learning of the decompression determination criterion is completed, the processor 141 may monitor the tire pressure based on the decompression determination criterion stored in the memory 142.

Figure 2:
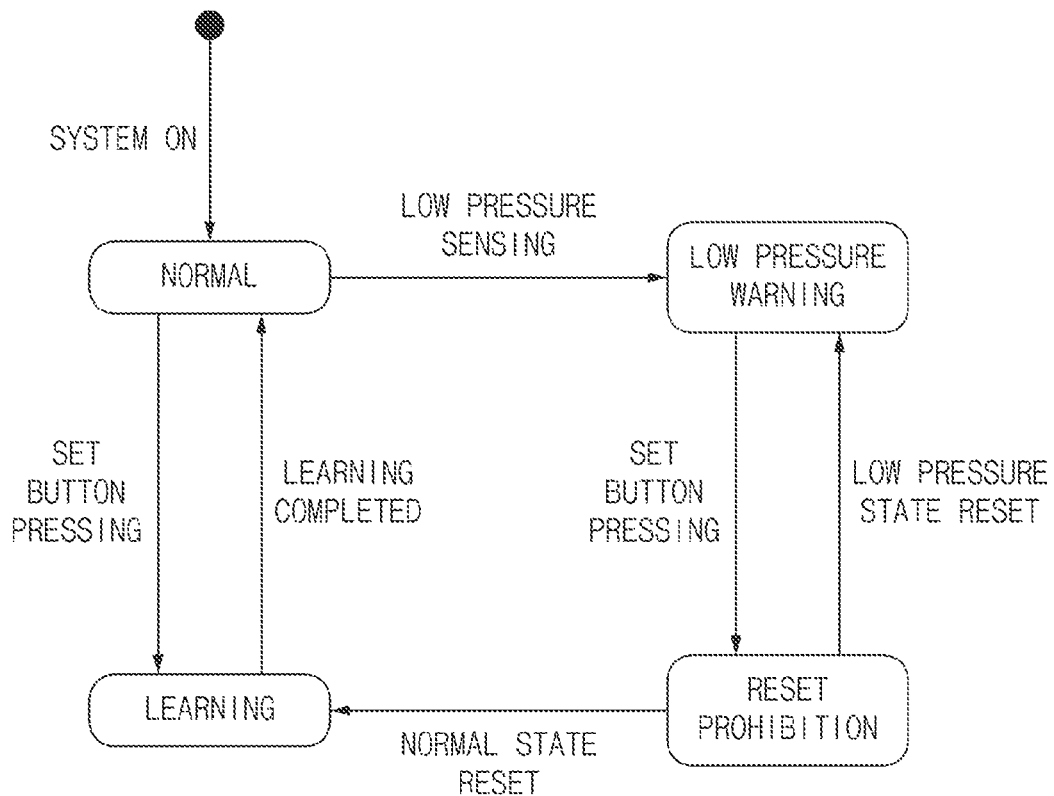
FIG. 2 illustrates a transition diagram of an operation mode of a tire pressure monitoring system according to embodiments of the present disclosure.

FIG. 2 illustrates a transition diagram of an operation mode of a tire pressure monitoring system according to embodiments of the present disclosure.

The tire pressure monitoring system (hereinafter, a system) 100 may be operated in four operation modes, that is, a normal mode, a learning mode, a low pressure warning mode, and a reset prohibition mode. The system 100 may activate the normal mode when power is applied to the vehicle and a system fail check is completed. When the set button 120 is pressed by the user in the normal mode, the system 100 may transition to the learning mode for learning the change in the dynamic radius and/or the frequency of the tire. When the learning is completed, the system 100 may transition from the learning mode to the normal mode. When sensing that the tire pressure is low during the travel in the normal mode, the system 100 transitions to the low pressure warning mode and may output the low pressure warning. The system 100 may transition to the reset prohibition mode when the set button 120 is pressed in the low pressure warning mode. The system 100 may determine whether the reset is the reset in the state in which the tire pressure is low or the reset in the state in which the tire pressure is normal in the reset prohibition mode. The system 100 may transition from the reset prohibition mode to the low pressure warning mode when the set button 120 is pressed in the state in which the tire pressure is low, and may transition from the reset prohibition mode to the learning mode when the set button 120 is pressed in the state in which the tire pressure is normal. The system 100 may use the reset prohibition mode to prevent the pressure setting from being reset resulting from the wrong manipulation of the set button 120 by the user after warning that the tire pressure is low.

Figure 3:
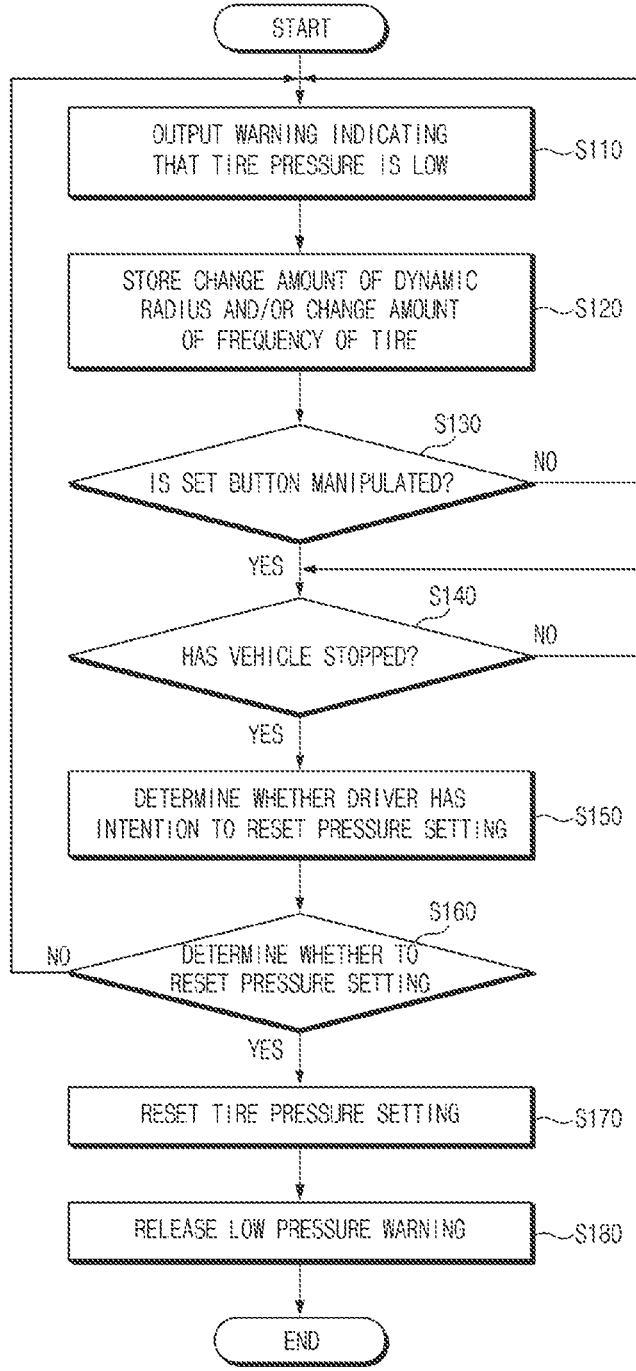
FIG. 3 is a flowchart illustrating a malfunction sensing method of a tire pressure monitoring system according to an embodiment of the present disclosure.

FIG. 3 is a flowchart illustrating a malfunction sensing method of a tire pressure monitoring system according to an embodiment of the present disclosure.

The controller 140 may output the warning indicating that the tire pressure is low (the low pressure warning) when sensing that the tire pressure is low during the vehicle travel (S110). The controller 140 may determine whether the tire pressure is low through analysis of the dynamic radius and/or the frequency of the tire using the sensor signal output from the wheel speed sensors 110. When it is determined that the tire pressure is low, the controller 140 may output the low pressure warning indicating the tire pressure is low.

The controller 140 may store the change amount of the dynamic radius and/or the change amount of the frequency of the tire during the low pressure warning (S120). The controller 140 may store the change amount of the dynamic radius and/or the change amount of the frequency obtained through the dynamic radius and frequency analysis in the memory 142.

The controller 140 may determine whether the set button 120 is manipulated after the low pressure warning (S130). The controller 140 may receive an event signal transmitted from the set button 120 after the low pressure warning, and determine whether the set button 120 is pressed based on the received event signal.

When sensing the manipulation of the set button 120, the controller 140 may determine whether the vehicle has stopped using the sensor signal of the wheel speed sensor 110 (S140). When the set button 120 is pressed, the controller 140 may determine whether the vehicle has stopped using the sensor signal of the wheel speed sensor 110. For example, when identifying that a vehicle speed is 0 kph (i.e., 0 mph) using the sensor signal of the wheel speed sensor 110, the controller 140 may determine that the vehicle has stopped.

When identifying that the vehicle has stopped, the controller 140 may determine whether the driver has an intention to reset the pressure setting (S150). The controller 140 may allow a pop-up window for identifying the intention to reset the pressure setting to be output on the display (e.g., the cluster). The controller 140 may determine whether there is the intention of the user to reset the pressure setting in response to a user response to a guide message for identifying the intention to reset the pressure setting.

The controller 140 may determine whether to reset the pressure setting based on the result of identifying the intention to reset the pressure setting of the driver (S160).

When the pressure setting reset is determined, the controller 140 may reset the tire pressure setting (S170). The controller 140 may store the change amount of the dynamic radius and/or the change amount of the frequency of the tire as the decompression determination criterion.

The controller 140 may reset the tire pressure setting and release the low pressure warning (S180). For example, the controller 140 may turn off the low pressure warning light.

When the manipulation of the set button 120 is not sensed in S130 or the pressure setting reset is not determined in S160, the controller 140 returns to S110.

Figure 4:
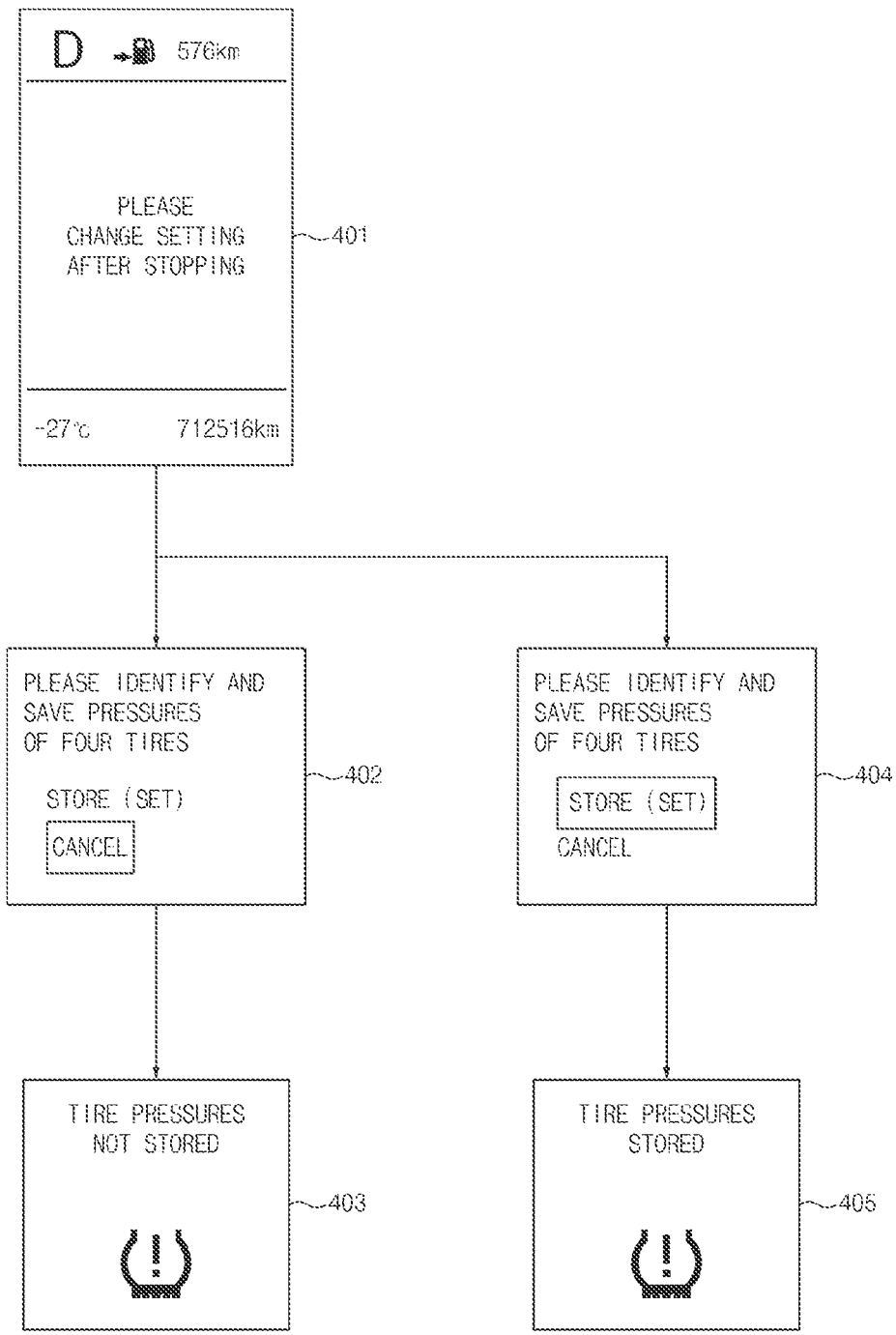
FIG. 4 is an exemplary view illustrating a display screen for each operation based on a malfunction sensing method illustrated in FIG. 3.

FIG. 4 is an exemplary view illustrating a display screen for each operation based on a malfunction sensing method illustrated in FIG. 3.

When the set button is pressed for 3 seconds or longer after the warning indicating that the tire pressure is low, the controller 140 may determine whether the vehicle has stopped. When the vehicle has not stopped, the controller 140 may output a screen 401 displaying a guide message such as "Please change the setting after stopping" on the display.

When the vehicle has stopped, the controller 140 may allow a pop-up 402 displaying a message such as "Please identify and save pressures of four tires" to be output to identify the intention of the driver to reset the tire pressure setting. In this connection, the controller 140 may allow the pop-up 402 in which 'cancel' is selected by default to be output. When 'cancel' is selected by the user in the pop-up 402, the controller 140 may output a guide message 403 such as "Tire pressures not stored" without storing the tire pressures. When 'store' is selected by the user in a pop-up 404, the controller 140 may store the tire pressures and output a guide message 405 such as "Tire pressures stored."

Figure 5:
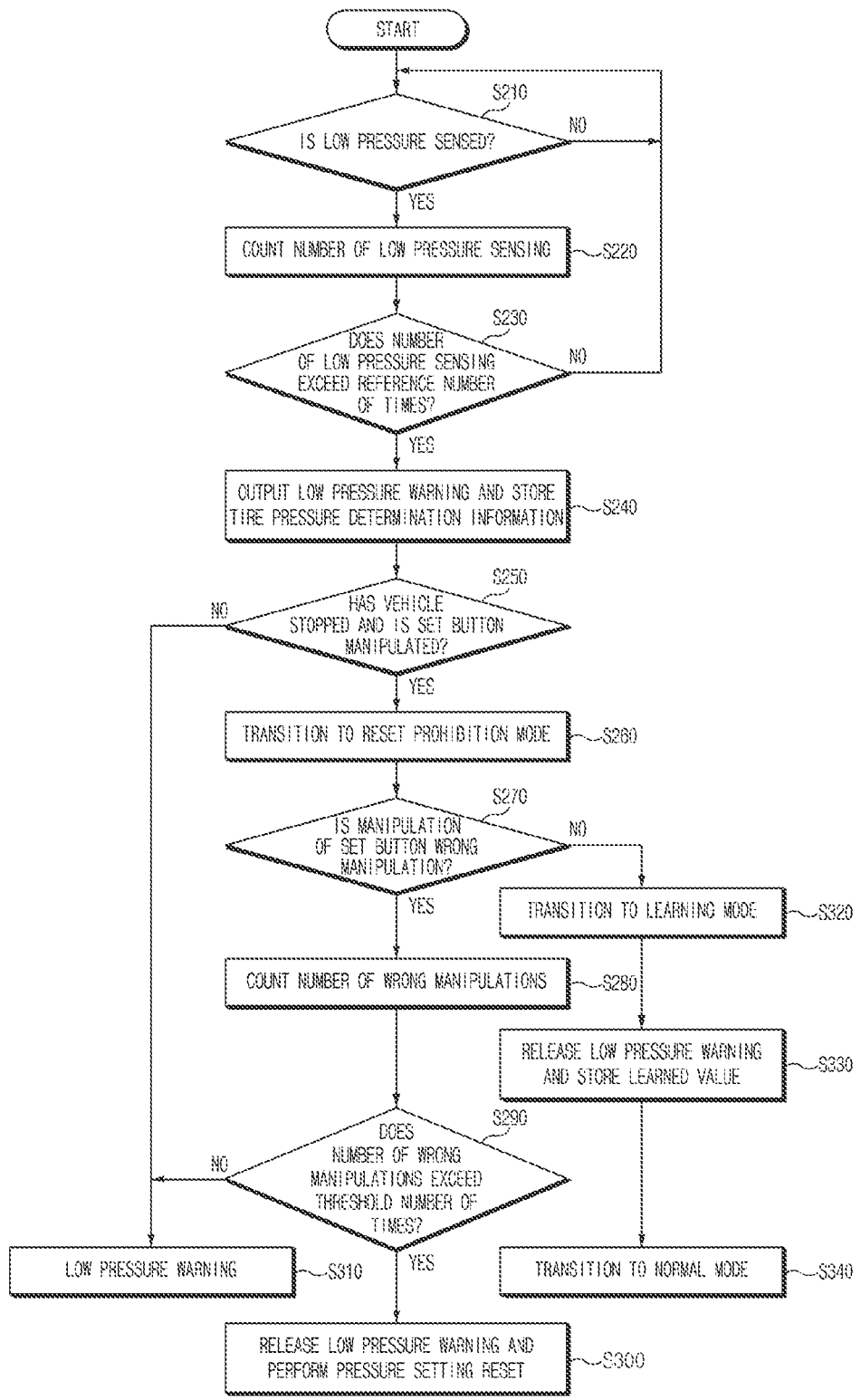
FIG. 5 is a flowchart illustrating a malfunction sensing method of a tire pressure monitoring system according to another embodiment of the present disclosure.

FIG. 5 is a flowchart illustrating a malfunction sensing method of a tire pressure monitoring system according to another embodiment of the present disclosure.

Referring to FIG. 5, the controller 140 may sense that the tire pressure is low based on the tire pressure determination information obtained using the wheel speed sensor 110 during the travel in the state in which the operation mode is the normal mode (S210). The controller 140 may determine that the tire pressure is low when the change amount of the dynamic radius and/or the change amount of the frequency of the tire exceeds a threshold value. When the tire pressure is not sensed as low in S210, the controller 140 may maintain the operation mode as the normal mode.

When sensing that the tire pressure is low, the controller 140 may count the number of low pressure sensing (S220). The controller 140 may increase the number of low pressure sensing by +1 whenever the tire pressure is sensed as low.

The controller 140 may determine whether the number of low pressure sensing exceeds the previously stored reference number of times (S230). When the number of low pressure sensing does not exceed the reference number of times, the controller 140 may maintain the operation mode as a normal mode.

When the number of low pressure sensing exceeds the reference number of times, the controller 140 may output the low pressure warning and store the tire pressure determination information in the memory 142 (S240). When the number of low pressure sensing exceeds the reference number of times, the controller 140 may transition from the normal mode to the low pressure warning mode and turn on the low pressure warning light. The controller 140 may store the change amount of the dynamic radius and/or the change amount of the frequency of the tire when the low pressure warning light is turned on.

The controller 140 may determine whether the set button 120 is manipulated when the vehicle stops during the low pressure warning (S250).

When the manipulation of the set button 120 is sensed, the controller 140 may transition from the low pressure warning mode to the reset prohibition mode (S260).

The controller 140 may determine whether the manipulation of the set button 120 is the wrong manipulation in the reset prohibition mode (S270). When the set button 120 is manipulated within the preset time from the low pressure warning time point, the controller 140 may determine that the manipulation of the set button 120 is the wrong manipulation. When the set button 120 is manipulated after the predetermined time elapses from the low pressure warning time point, the controller 140 may determine that the manipulation of the set button 120 is not the wrong manipulation.

When it is determined that the manipulation of the set button 120 is the wrong manipulation, the controller 140 may count the number of wrong manipulations (S280). The controller 140 may store the counted number of wrong manipulations in the memory 142.

The controller 140 may determine whether the number of wrong manipulations exceeds the threshold number of times (S290). The threshold number of times may be set in advance by a system designer.

When the number of wrong manipulations exceeds the threshold number of times, the controller 140 may release the low pressure warning and perform the pressure setting reset (S300). The controller 140 may turn off the low pressure warning light, and may transition from the reset prohibition mode to the learning mode.

When the vehicle has not stopped or the set button 120 is not manipulated in the state in which the vehicle has stopped in S250, or when the number of wrong manipulations does not exceed the threshold number of times in S290, the controller 140 may maintain the low pressure warning mode (S310). For example, the controller 140 may maintain the low pressure warning light to be turned on.

When the manipulation of the set button 120 is not the wrong manipulation (that is, is the normal manipulation) in S270, the controller 140 may transition from the low pressure warning mode to the learning mode (S320). The controller 140 may learn the change in the dynamic radius and/or the change in the frequency of the tire using the wheel speed sensor 110.

The controller 140 may release the low pressure warning and store the learned change amount of the dynamic radius and/or change amount of the frequency of the tire (S330). The controller 140 may transition from the learning mode to the normal mode when the learning of the change of the dynamic radius and/or the change of the frequency of the tire is completed (S340).

Figure 6:
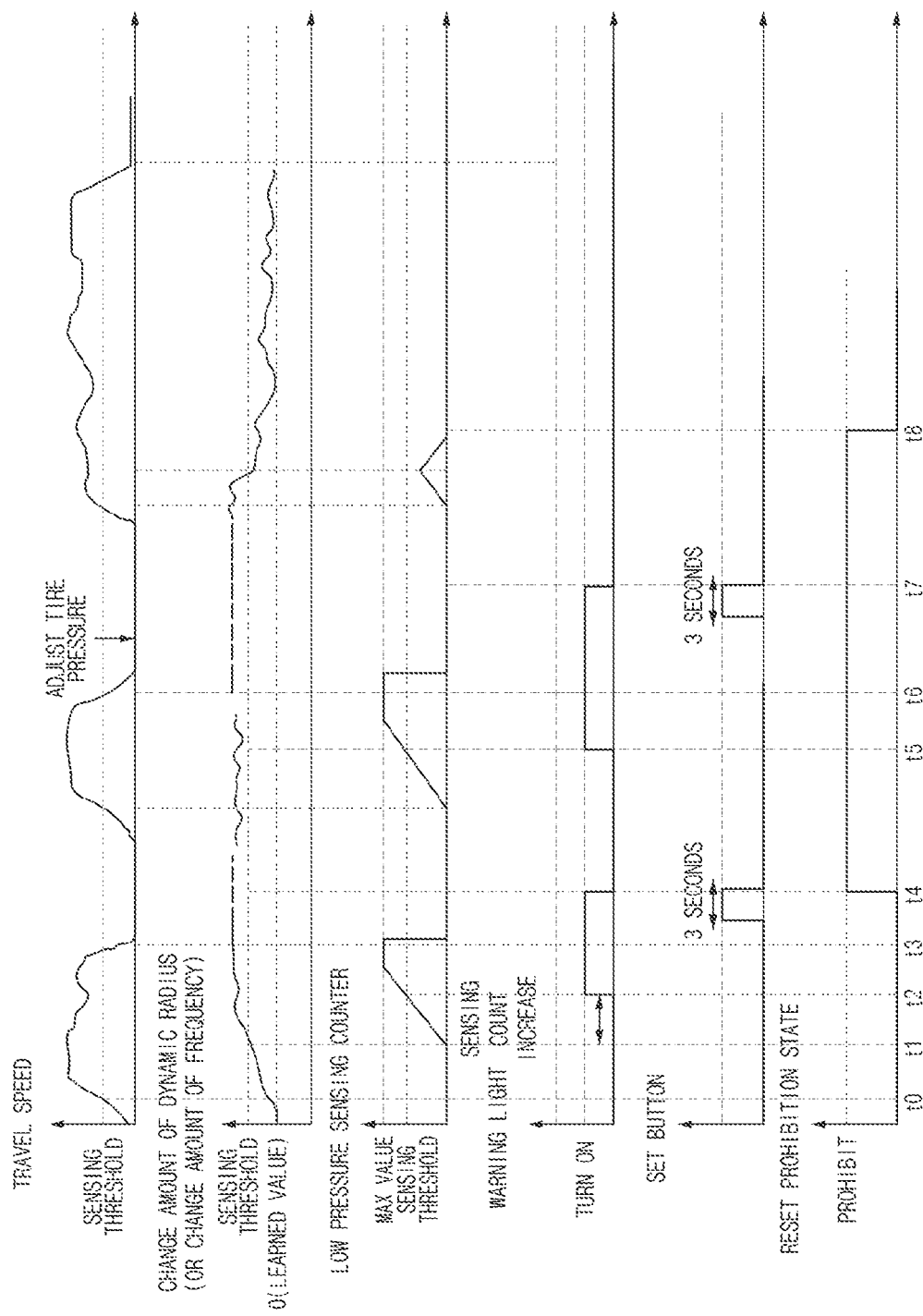
FIG. 6 is a timing diagram illustrating a process of resetting tire pressure setting after adjusting a tire pressure in a low pressure state according to embodiments of the present disclosure.

FIG. 6 is a timing diagram illustrating a process of resetting a tire pressure setting after adjusting a tire pressure in a low pressure state according to embodiments of the present disclosure.

When the travel speed is equal to or higher than a threshold speed, the controller 140 starts analyzing the dynamic radius and frequency of the tire using the wheel speed sensor 110 (to).

When the change amount of the dynamic radius exceeds a threshold change amount, the controller 140 determines that the low pressure has occurred and counts the number of low pressure sensing (the number of low pressure occurrences) (t1). When the number of low pressure sensing exceeds the threshold number of times, the controller 140 may determine that the tire pressure is low and output the low pressure warning (e.g., turn on the warning light) (t2). The controller 140 may store the change amount of the dynamic radius of the tire during the low pressure warning (t3). The controller 140 may reset a counter for counting the number of low pressure sensing when storing the change amount of the dynamic radius.

When the user manipulates the set button 120 for 3 seconds or longer after the vehicle stops, the controller 140 may sense the manipulation of the set button 120 and release the low pressure warning (t4). That is, the controller 140 may turn off the low pressure warning light when the set button is pressed in the state in which the vehicle has stopped. When sensing the manipulation of the set button 120 during the low pressure warning, the controller 140 transitions from the low pressure warning mode to the reset prohibition mode and prohibits the pressure setting reset.

When the vehicle starts to travel again, the controller 140 starts monitoring the tire pressure using the previously stored change amount of the dynamic radius as the initial value. When the travel speed is equal to or higher than the threshold speed and the change amount of the dynamic radius exceeds the threshold change amount, the controller 140 counts the number of low pressure sensing. When the counted number of low pressure sensing exceeds the threshold number of times, the controller 140 may re-output the low pressure warning indicating that the tire pressure is low (t5). The controller 140 may re-turn on the low pressure warning light to re-warn that the tire pressure is low, and store the change amount of the dynamic radius (t6).

When the user manipulates the set button 120 after adjusting the tire pressure, the low pressure warning is released (t7). The controller 140 may monitor the tire pressure when the vehicle starts travel again, and maintain the state in which the low pressure warning is released based on the monitoring result. For example, when the change amount of the dynamic radius of the tire returns to be within the normal range, the controller 140 may maintain the state in which the low pressure warning light is turned off. When it is determined to maintain the state in which the low pressure warning is released, the controller 140 may deactivate the pressure setting reset prohibition mode (t8).

In the above-described embodiment, it is described as an example that whether the tire pressure is low is inspected through the analysis of the dynamic radius of the tire, but the present disclosure is not limited thereto. Whether the tire pressure is low may be inspected through the analysis of the frequency of the tire.

Figure 7:
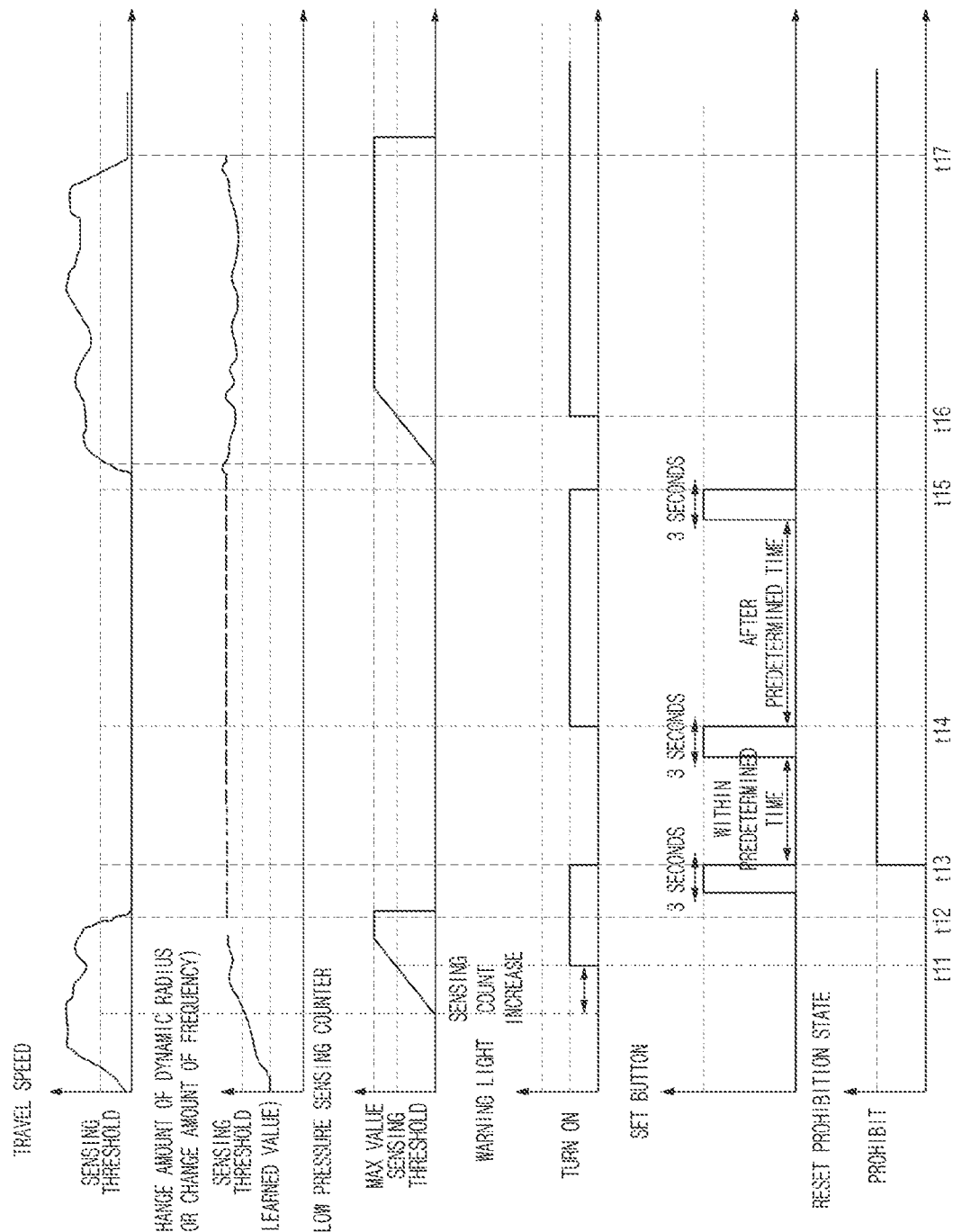
FIG. 7 is a timing diagram illustrating a process of resetting tire pressure setting without tire pressure adjustment in a low pressure state according to embodiments of the present disclosure.

FIG. 7 is a timing diagram illustrating a process of resetting a tire pressure setting without tire pressure adjustment in a low pressure state according to embodiments of the present disclosure.

The controller 140 starts analyzing the dynamic radius and/or the frequency of the tire using the wheel speed sensor 110 when the travel speed is equal to or higher than the threshold speed. When the change amount of the dynamic radius exceeds the threshold change amount, the controller 140 determines that the low pressure has occurred and counts the number of low pressure sensing (the number of low pressure occurrences). When the number of low pressure sensing exceeds the threshold number of times, the controller 140 may determine that the tire pressure is low and output the low pressure warning (e.g., turn on the warning light) (t11). The controller 140 may store the change amount of the dynamic radius (and/or the change amount of the frequency) of the tire during the low pressure warning (t12). The controller 140 may reset the counter for counting the number of low pressure sensing when storing the change amount of the dynamic radius.

When the user manipulates the set button 120 for 3 seconds or longer after the vehicle stops, the controller 140 may sense the manipulation and release the low pressure warning (t13). That is, the controller 140 may turn off the low pressure warning light when the set button is pressed in the state in which the vehicle has stopped. When sensing the manipulation of the set button 120 during the low pressure warning, the controller 140 transitions from the low pressure warning mode to the reset prohibition mode and prohibits the pressure setting reset.

When the manipulation of the set button 120 is sensed after the low pressure warning, the controller 140 may determine whether the manipulation is the wrong manipulation. When the set button 120 is manipulated within a predetermined time from a time point at which the set button 120 is pressed previously, the controller 140 determines the manipulation as the wrong manipulation and turns on the low pressure warning light (t14). The controller 140 re-warns that the tire pressure is low and maintains the pressure setting reset prohibition.

When the manipulation of the set button 120 is sensed during the re-warning of the low pressure, the controller 140 may determine whether the corresponding manipulation is the wrong manipulation. When the set button 120 is manipulated after the predetermined time elapses from the time point at which the set button 120 is pressed previously, the controller 140 determines the corresponding manipulation as the normal manipulation and turns off the low pressure warning light (t15). In this connection, the controller 140 maintains the pressure setting reset prohibition.

Thereafter, when the vehicle starts travel again, the controller 140 performs the tire pressure monitoring and outputs the low pressure warning again when it is sensed that the tire pressure is low (t16). The controller 140 maintains the pressure setting reset prohibition and stores the change amount of the dynamic radius of the tire (t17).

In the above-described embodiment, it is described as an example that whether the tire pressure is low is inspected through the analysis of the dynamic radius of the tire, but the present disclosure is not limited thereto. Whether the tire pressure is low may be inspected through the analysis of the frequency of the tire.

Figure 8:
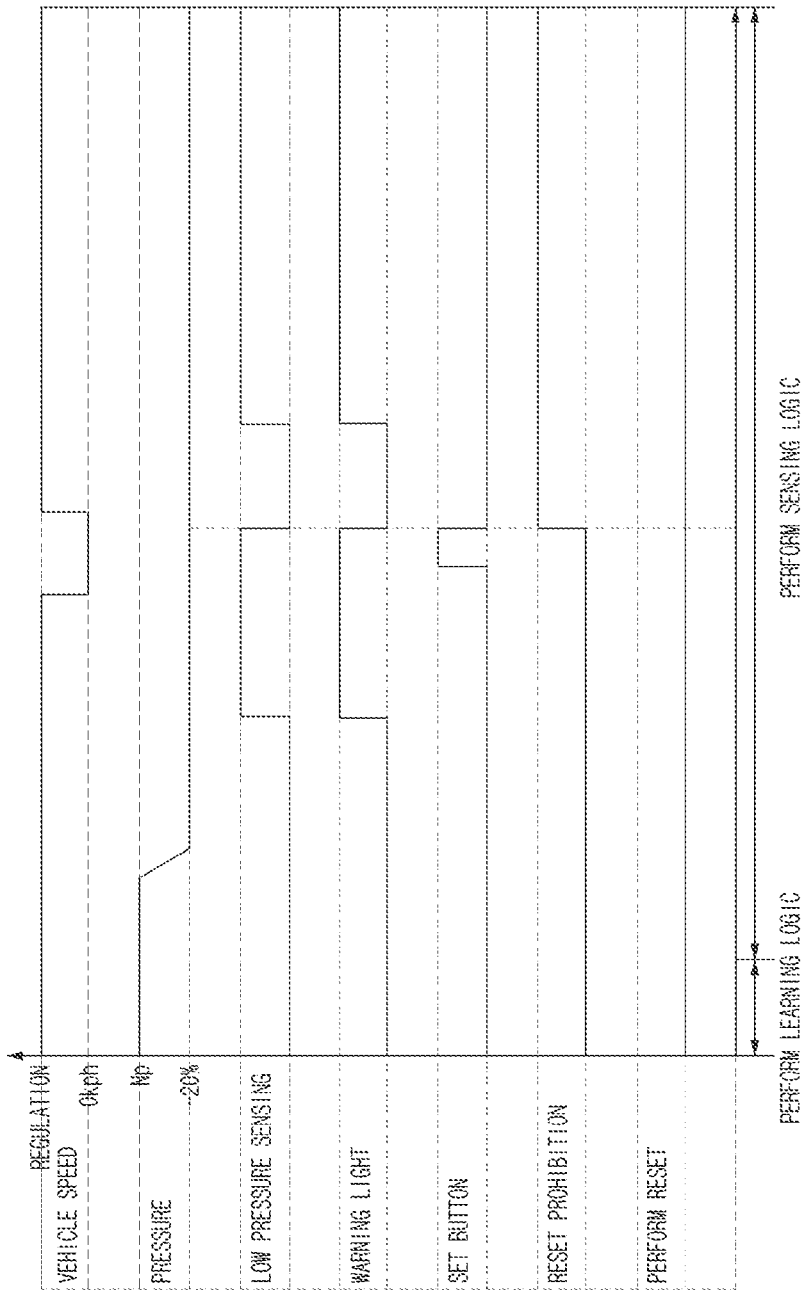
FIG. 8 is a timing diagram for illustrating a reset prohibition mode activation situation according to embodiments of the present disclosure.

FIG. 8 is a timing diagram for illustrating a reset prohibition mode activation situation according to embodiments of the present disclosure.

Referring to FIG. 8, when sensing decompression of the tire pressure during the travel, the controller 140 turns on the low pressure warning light. Thereafter, when the driver presses the set button 120, the controller 140 turns off the low pressure warning light and prohibits the pressure setting reset. As the pressure setting reset is prohibited, even when the driver manipulates the set button 120 in the state in which the tire pressure is low, reset or recalibration of the system wo may be prohibited.

The controller 140 inspects the decompression of the tire pressure again in the state in which the pressure setting reset is prohibited. When it is determined that the tire pressure is low, the controller 140 determines that there has been an attempt to reset the pressure setting in the low pressure state, transitions to the low pressure warning mode, and turns on the low pressure warning light again.

Figure 9:
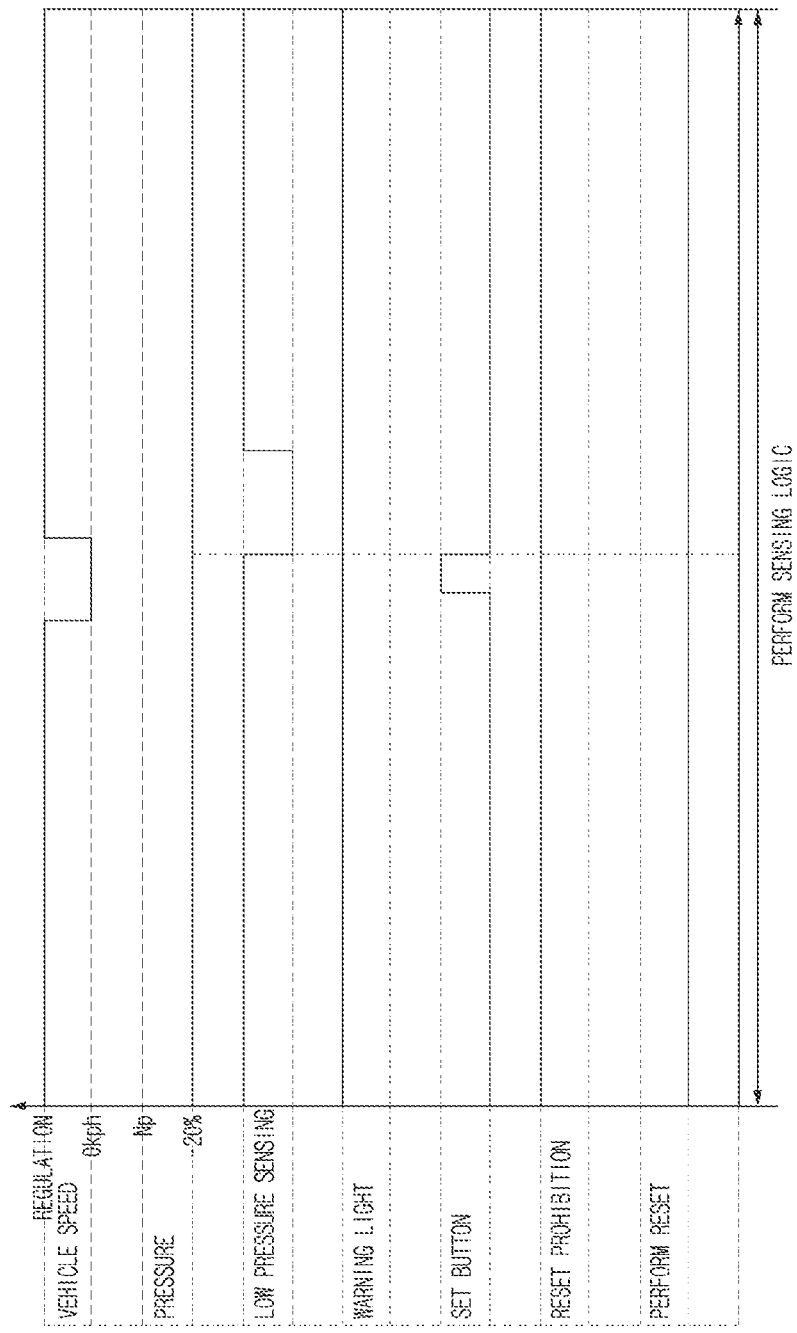
FIG. 9 is a timing diagram for illustrating a situation in which a low pressure warning is maintained in a reset prohibition mode according to embodiments of the present disclosure.

FIG. 9 is a timing diagram for illustrating a situation in which a low pressure warning is maintained in a reset prohibition mode according to embodiments of the present disclosure.

Referring to FIG. 9, when the driver activates the pressure setting reset prohibition mode through the set button wrong manipulation of the driver and then manipulates the set button again, the controller 140 identifies a time difference between a pressure setting reset prohibition determination time point and the set button pressed time point. When the identified time difference is within a predetermined time, the controller 140 determines the set button manipulation of the driver as the wrong manipulation, does not turn off the low pressure warning light, and re-inspects the tire pressure state while maintaining the state in which the pressure setting reset is prohibited.

Figure 10:
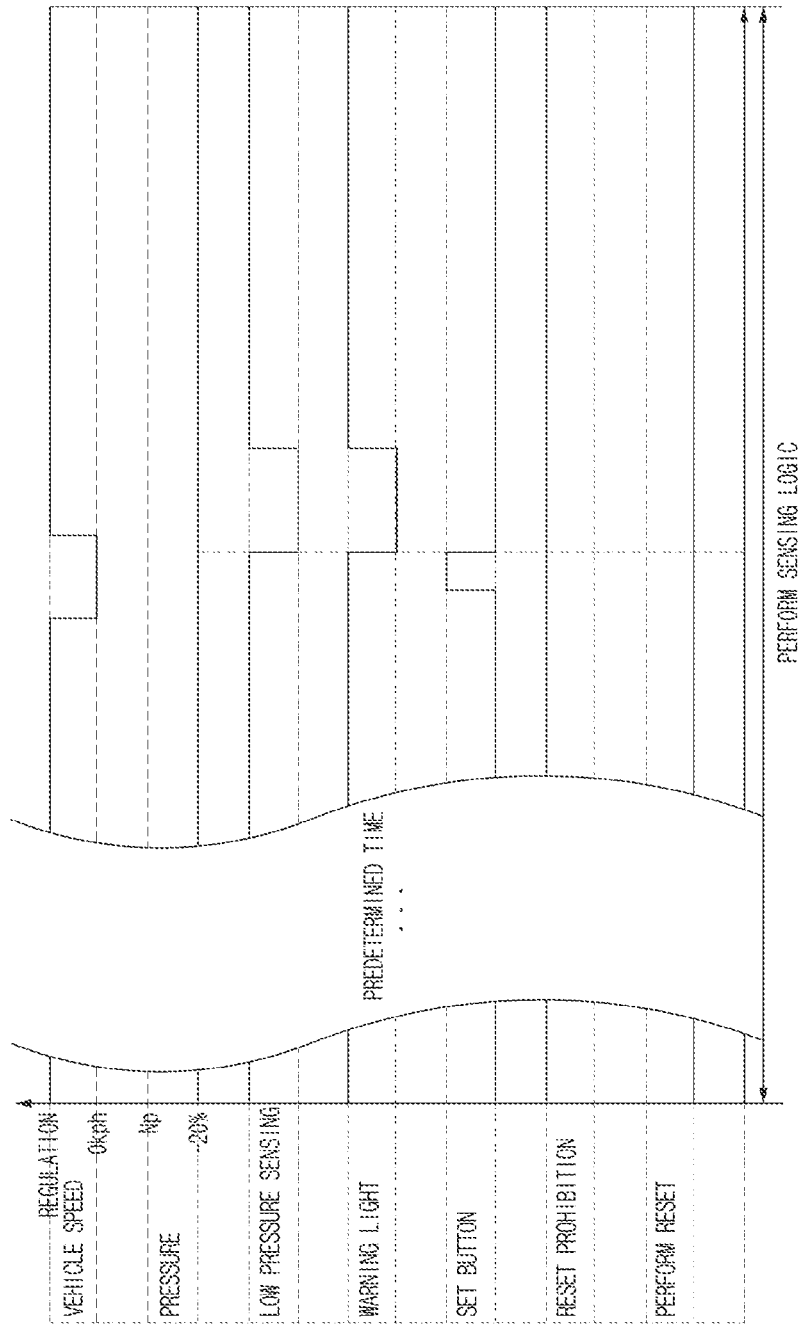
FIG. 10 is a timing diagram illustrating a situation in which a low pressure warning is released after activating a reset prohibition mode according to embodiments of the present disclosure.

FIG. 10 is a timing diagram illustrating a situation in which a low pressure warning is released after activating a reset prohibition mode according to embodiments of the present disclosure.

When the driver activates the pressure setting reset prohibition mode through the set button wrong manipulation of the driver and then manipulates the set button again, the controller 140 identifies the time difference between the pressure setting reset prohibition determination time point and the set button pressed time point. When the identified time difference exceeds the predetermined time, the controller 140 turns off the low pressure warning light by determining that the set button was pressed after adjusting the pressure. In addition, the controller 140 maintains the pressure setting reset prohibition state and re-inspects the tire pressure state.

Figure 11:
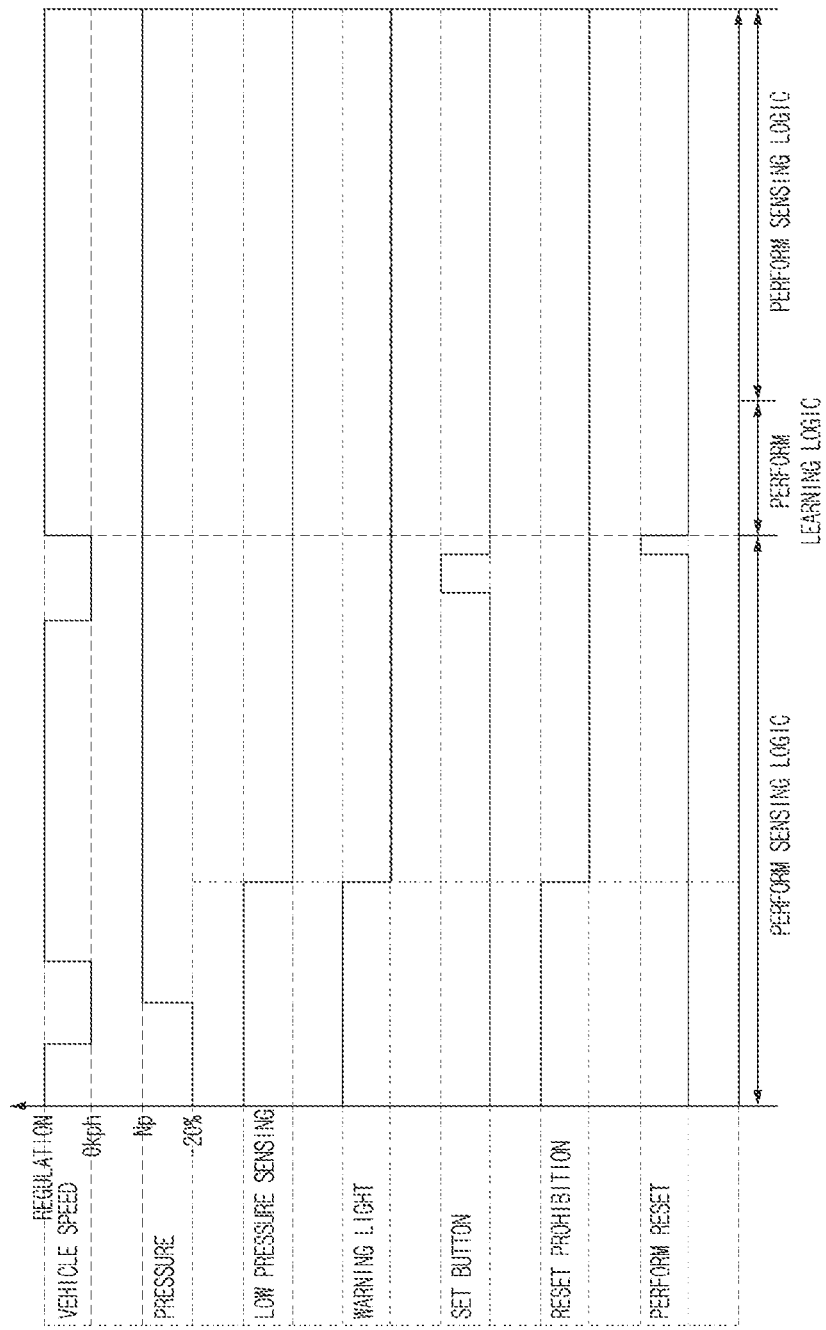
FIG. 11 is a timing diagram for illustrating a situation in which a reset prohibition mode is transitioned to a learning mode according to embodiments of the present disclosure.

FIG. 11 is a timing diagram for illustrating a situation in which a reset prohibition mode is transitioned to a learning mode according to embodiments of the present disclosure.

Referring to FIG. 11, when the pressure normal state of the tire is checked through tire pressure state monitoring in the pressure setting reset prohibition state, the low pressure warning light is turned off, and the pressure setting reset prohibition is canceled.

Thereafter, when the set button 120 is manipulated by the driver, the controller 140 transitions to the learning mode to learn the tire pressure, and stores the learned tire pressure in the memory 142.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to embodiments of the present disclosure, the system reset resulting from the wrong manipulation of the user in the state in which the tire pressure is low may be prevented.

In addition, according to embodiments of the present disclosure, when the system reset is attempted without the pressure adjustment in the state in which tire pressure is low, because the state in which the tire pressure is low is re-alarmed, accidents caused by the low tire pressure may be prevented in advance.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for monitoring a tire pressure, the system comprising:
a wheel speed sensor mounted on each wheel of a vehicle;
a set button for resetting a pressure setting; and
a controller configured to:
determine whether the tire pressure is low using the wheel speed sensor;
output a low pressure warning;
determine whether a user has an intention to reset the pressure setting when a manipulation of the set button is sensed after the low pressure warning is output which includes allowing the user to select by default that the user has no intention to reset the pressure setting; and
reset the pressure setting in response to a response of the user indicating that the user has the intention to reset the pressure setting.

2. A system for monitoring a tire pressure, the system comprising:
a wheel speed sensor mounted on each wheel of a vehicle;
a set button for resetting a pressure setting; and
a controller connected to the wheel speed sensor and the set button, wherein the controller is configured to:
determine whether the tire pressure is low using the wheel speed sensor;
output a low pressure warning when the tire pressure is low;
store tire pressure determination information;
activate a pressure setting reset prohibition mode when the vehicle is stopped and a manipulation of the set button are sensed; and
output the low pressure warning when a wrong manipulation of the set button is sensed in the pressure setting reset prohibition mode.

3. The system of claim 2, wherein the tire pressure determination information includes at least one of a change amount of a dynamic radius or a change amount of a frequency of a tire.

4. The system of claim 3, wherein the controller is configured to:
count a number of low pressure occurrences when at least one of the change amount of the dynamic radius or the change amount of the frequency exceeds a threshold value; and
output the low pressure warning when the number of low pressure occurrences exceeds a reference number of times.

5. The system of claim 2, wherein the controller is configured to monitor a state of the tire pressure using the stored tire pressure determination information as an initial value when the vehicle travels again after stopping.

6. The system of claim 2, wherein the controller is configured to determine a re-manipulation of the set button as the wrong manipulation of the set button when the set button is manipulated again in the pressure setting reset prohibition mode within a predetermined time from a low pressure warning output time point.

7. The system of claim 2, wherein the controller is configured to determine a re-manipulation of the set button as a normal manipulation when the set button is manipulated again in the pressure setting reset prohibition mode after a predetermined time elapses from a low pressure warning output time point.

8. The system of claim 2, wherein the controller is configured to:
count a number of wrong manipulations whenever the wrong manipulation of the set button is sensed; and
perform a pressure setting reset while releasing the low pressure warning when the number of wrong manipulations exceeds a threshold number of times.

9. The system of claim 2, wherein the controller is configured to release the low pressure warning but maintain the pressure setting reset prohibition mode when the manipulation of the set button is a normal manipulation in the pressure setting reset prohibition mode.

10. The system of claim 2, wherein the controller is configured to release the low pressure warning and cancel the pressure setting reset prohibition mode when it is identified that the tire pressure is in a normal state in the pressure setting reset prohibition mode.

11. The system of claim 2, wherein the controller is configured to output the low pressure warning again and maintain the pressure setting reset prohibition mode when it is identified that the tire pressure is in an abnormal state in the pressure setting reset prohibition mode.

12. A method for sensing malfunction of a system for monitoring a tire pressure, the method comprising:
inspecting a state of the tire pressure using a wheel speed sensor;
outputting a low pressure warning when it is determined that the tire pressure is low;
determining whether a driver has an intention to reset a pressure setting when a manipulation of a set button is sensed during the low pressure warning, wherein determining whether the driver has the intention to reset the pressure setting includes allowing the driver to select by default that the driver has no intention to reset the pressure setting; and
performing a pressure setting reset when the driver has the intention to reset the pressure setting.

13. A method for sensing malfunction of a system for monitoring a tire pressure, the method comprising:
performing a first operation of sensing that the tire pressure is low using a wheel speed sensor, outputting a low pressure warning, and storing tire pressure determination information;
performing a second operation of activating a pressure setting reset prohibition mode and determining whether a manipulation of a set button is a wrong manipulation when vehicle stop and the manipulation of the set button are sensed after the low pressure warning; and
performing a third operation of outputting the low pressure warning when the manipulation of the set button is determined as the wrong manipulation.

14. The method of claim 13, wherein the first operation includes:
determining whether at least one of a change amount of a dynamic radius or a change amount of a frequency of a tire exceeds a threshold value;
counting a number of low pressure occurrences when the at least one change amount exceeds the threshold value;
outputting the low pressure warning when the number of low pressure occurrences exceeds a reference number of times; and
storing the at least one change amount.

15. The method of claim 13, wherein the second operation includes:
determining a re-manipulation of the set button as a wrong manipulation of the set button when the set button is manipulated again within a predetermined time from a low pressure warning output time point; and determining a re-manipulation of the set button as a normal manipulation when the set button is manipulated again after a predetermined time elapses from the low pressure warning output time point.

16. The method of claim 15, wherein the third operation includes:

counting a number of wrong manipulations whenever the wrong manipulation of the set button is determined; and performing a pressure setting reset while releasing the low pressure warning when the number of wrong manipulations exceeds a threshold number of times.

17. The method of claim 15, wherein, when the normal manipulation of the set button is sensed, the third operation includes releasing the low pressure warning, learning the tire pressure using the wheel speed sensor, and storing the learned value.

18. The system of claim 1, wherein the controller is further configured to store tire pressure determination information.

19. The system of claim 1, wherein the controller is configured to determine whether the tire pressure is low based on at least one of a change amount of a dynamic radius or a change amount of a frequency of a tire.

20. The system of claim 19, wherein the controller is configured to:

count a number of low pressure occurrences when at least one of the change amount of the dynamic radius or the change amount of the frequency exceeds a threshold value; and output the low pressure warning when the number of low pressure occurrences exceeds a reference number of times.

* * * * *